United States Patent
Pereira-Santo (10) Patent No.: US 12,515,347 B2
(45) Date of Patent: Jan. 6, 2026

(54) DEVICE FOR PERFORMING AT LEAST ONE TASK ON A STRUCTURE TO BE WORKED ON, SAID DEVICE COMPRISING A TELESCOPIC PRESSER ELEMENT

(71) Applicants: SETI-TEC, Collegien (FR); KAWASAKI HEAVY INDUSTRIES, LTD., Hyogo (JP)

(72) Inventor: Sébastien Pereira-Santo, Charneca da Caparica (PT)

(73) Assignees: SETI-TEC, Collegien (FR); KAWASAKI HEAVY INDUSTRIES, LTD., Hyogo (JP)

( * ) Notice: Subject to any disclaimer, the term of this patent is extended or adjusted under 35 U.S.C. 154(b) by 74 days.

(21) Appl. No.: 18/716,233

(22) PCT Filed: Dec. 6, 2022

(86) PCT No.: PCT/EP2022/084660
§ 371 (c)(1),
(2) Date: Jun. 4, 2024

(87) PCT Pub. No.: WO2023/104829
PCT Pub. Date: Jun. 15, 2023

(65) Prior Publication Data
US 2025/0033218 A1   Jan. 30, 2025

(30) Foreign Application Priority Data
Dec. 9, 2021   (FR) ...................................... 2113240

(51) Int. Cl.
*B25J 15/00*   (2006.01)
*B25J 11/00*   (2006.01)
*B25J 13/08*   (2006.01)

(52) U.S. Cl.
CPC ........... *B25J 11/005* (2013.01); *B25J 13/087* (2013.01); *B25J 15/0019* (2013.01)

(58) Field of Classification Search
CPC .... B25J 13/087; B25J 11/005; B25J 15/0095; B25J 15/0019
See application file for complete search history.

(56) References Cited

U.S. PATENT DOCUMENTS

| | | | |
|---|---|---|---|
| 9,061,424 | B2 | 6/2015 | Prat et al. |
| 10,639,804 | B2 | 5/2020 | Boria et al. |
| 2004/0102136 | A1 | 5/2004 | Wood et al. |

FOREIGN PATENT DOCUMENTS

| | | |
|---|---|---|
| FR | 2 809 034 B1 | 11/2002 |
| WO | 03049899 A2 | 6/2003 |

(Continued)

OTHER PUBLICATIONS

Penin et al., Telerobotic system for live power lines maintenance: ROBTET, 1998, IEEE, p. 2110-2115 (Year: 1998).*

(Continued)

*Primary Examiner* — McDieunel Marc
(74) *Attorney, Agent, or Firm* — David D. Brush; Westman, Champlin & Koehler, P.A.

(57) ABSTRACT

A device for performing at least one task on a structure to be worked on. The device includes: a frame; a fastener for fastening the frame to a motor-driven handling element capable of moving the device in space relative to a structure to be worked on; a spindle rotatably and/or translationally driven along a same axis to perform the at least one task; a presser element, coaxial with the spindle, capable of exerting a compressive force against the surface of the structure to be worked on. The presser element has a first and a second element connected by a ball-and-socket joint, the second element including a free end adapted to contact the surface and the first element being translationally movable along the (Continued)

axis of the spindle such that the second element is oriented orthogonally to the surface when compressed against the surface.

17 Claims, 5 Drawing Sheets

(56) References Cited

FOREIGN PATENT DOCUMENTS

| WO | 2020212631 A1 | 10/2020 |
|---|---|---|
| WO | 2022008039 A1 | 1/2022 |
| WO | 2022008040 A1 | 1/2022 |
| WO | 2022008041 A1 | 1/2022 |
| WO | 2022008042 A1 | 1/2022 |
| WO | 2022008043 A1 | 1/2022 |

OTHER PUBLICATIONS

Gao et al., A Dexterous, Reconfigurable, Adaptive Robot Hand Combining Anthropomorphic and Interdigitated Configurations, 2021, IEEE, pg., (Year: 2021).*
Hanafusa et al., A telescopic robot arm design performing space-saving motion for autonomous mobile robots, 2022, IEEE, p. 446-451 (Year: 2022).*
Li et al., Configuration Synthesis and Design of a Telescopic Service Robot, 2018, IEEE, p. 442-445 (Year: 2018).*
International Search Report dated Mar. 6, 2023 for corresponding International Application No. PCT/EP2022/084660, filed Dec. 6, 2022.
Written Opinion of the International Searching Authority dated Mar. 6, 2023 for corresponding International Application No. PCT/EP2022/084660, filed Dec. 6, 2022.
English translation of the Written Opinion of the International Searching Authority dated Mar. 6, 2023 for corresponding International Application No. PCT/EP2022/084660, filed Dec. 6, 2022.

* cited by examiner

DEVICE FOR PERFORMING AT LEAST ONE TASK ON A STRUCTURE TO BE WORKED ON, SAID DEVICE COMPRISING A TELESCOPIC PRESSER ELEMENT

1. CROSS-REFERENCE TO RELATED APPLICATIONS

This Application is a Section 371 National Stage Application of International Application No. PCT/EP2022/084660, filed Dec. 6, 2022, and published as WO 2023/104829 A1 on Jun. 15, 2023, not in English, which claims priority to French Patent Application No. 2113240, filed Dec. 9, 2021, the contents of which are hereby incorporated by references in their entireties.

2. FIELD OF THE INVENTION

The field of the invention is that of the design and making of devices implemented in industry to perform various tasks on a structure to be worked on, in particular for the aeronautical industry.

3. PRIOR ART

Many devices are commonly implemented to perform various tasks or operations on a structure to be worked on. For example, it may be drilling, milling, setting a temporary fastener, coating a rivet with sealant and then setting the rivet in a hole drilled in the structure or any other operation.

Movable devices have been developed to enable tasks to be performed on complex structures such as aircraft for example.

These devices include, in particular, those of the type comprising a tool placed at the end of a robot arm to be manipulated and moved relative to the structure to be worked on, the device comprising securing means, such as suction cups for example, enabling the tool to be secured to the structure to be worked on in order to make it take up the forces due to the performance of the task in order to relieve the robot arm.

For example, a device of this type can carry a drilling device on board to enable drilling operations to be carried out.

Some devices, known as multitask devices, are likely to carry several functional modules on board, each dedicated to performing a particular task.

Such a device comprises a single output spindle likely to be rotatably and/or translationally driven along a same axis via motor and control means.

This single spindle can be made to cooperate alternately with the various on-board modules so as to enable performance of a task to which they are dedicated.

Patent applications PCT/EP2020/069158, PCT/EP2020/069159, PCT/EP2020/069160, PCT/EP2020/069161, PCT/EP2020/069162, filed by the applicant, describe multitask devices.

In the field of aeronautics, it is common to have to make holes in structures to be worked on comprising a stack of sheets which will subsequently have to be joined by means of rivets inserted in the holes. In this case, the drilling device is often equipped with a presser element. Such a presser element, which generally extends along the axis of the output spindle carrying the cutting tool, is translationally movable along this axis in order to be pressed against the structure to be worked on before making the hole. The implementation of the presser element keeps the sheets pressed together during drilling and prevents chips from being inserted between the sheets during drilling.

The presser element can be secured to the device by means of a ball joint, the axis of which is the same as that of the spindle.

Such a ball joint assembly may have the advantage of offering the possibility, by measuring the inclination of the axis of the presser element relative to the axis of the spindle, of ensuring that the axis of the spindle is indeed orthogonal to the surface of the structure to be worked on, which is the case when the presser element bears against the surface of the structure to be worked on and the inclination of its axis relative to that of the spindle is zero.

Besides, it is generally desirable, for reasons of overall size and cost, to implement a small robot arm to move a multitask device. To do this, securing means, such as suction cups, are used to fasten the device to the structure to be worked on and thus to have the forces due to the performance of the tasks taken up by the structure to be worked on rather than by the robot arm.

This robot arm makes it possible, when using a presser element, to bear it against the structure to be worked on. To reduce the size of the robot arm when a presser element is implemented, it may be useful to mount the presser element translationally movable along the axis of the spindle and to implement specific driving means. Such a mounting can also enable measurement of the pressing forces applied by the presser element against the structure to be worked on.

Further to checking the normality of the spindle relative to the structure to be worked on and measuring the pressing forces of the presser element against the structure to be worked on, it may be useful to know other parameters such as for example:
- the initial distance between the end effector and the surface at the moment when the presser element contacts the surface;
- the depth of movement of the surface at the moment when the force of the presser element is applied to the surface.

However, to date, there is no multitask device provided with a presser element that can perform all of these functions in a simple, efficient and compact manner.

There is therefore a need to improve multitask devices in this respect.

In this way, the use of presser elements can be improved.

4. SUMMARY

An exemplary embodiment of the present invention provides a device for performing at least one task on a structure to be worked on, said device comprising:
- a frame;
- means for fastening said frame to motor-driven handling means capable of moving said device at least partly in space relative to a structure to be worked on;
- means for positioning and/or securing said device to said structure to be worked on; and
- a spindle likely to be rotatably and/or translationally driven along a same axis in order to perform said at least one task;
- a presser element, coaxial with said spindle, capable of exerting a compressive force against the surface of said structure to be worked on when said device is secured to said structure by said fastening means;
- said presser element comprising a first and a second element connected by a ball-and-socket joint, said second element comprising a free end capable of contacting said surface and said first element being translationally movable along the axis of said spindle in such a way that the second element is oriented orthogonally to said surface when compressed against said surface.

Thus, according to this aspect of the invention, the invention is based on the implementation of a telescopic presser element whose end has a ball joint.

The combined implementation of a telescopic presser element with a ball joint furthermore offers the possibility of performing a multitude of functions providing a versatile device, such as especially:

checking the normality of the axis of the spindle relative to the surface of a structure to be worked on;
evaluating the force applied by the presser element against the structure to be worked on;
evaluating the initial distance between the end effector and the surface at the moment when the presser element contacts the surface;
evaluating the depth of movement of the surface when the force of the presser element is applied to the surface.
The implementation of the invention thus provides a multitask device provided with a presser element, which is compact and versatile.

According to one possible characteristic, a device according to the invention comprises means for translationally driving said first element.

When a device according to the invention is implemented to carry out a method for performing at least one task, these means may enable a step of translationally driving said first element to be implemented.

According to one possible characteristic, said translational driving means comprise a screw-nut system.

According to one possible characteristic, said screw-nut system comprises a threaded portion provided at the periphery of said first element and a rotatably movable tapped ring of complementary shape, said translational driving means comprising means for rotatably driving said ring relative to said first rotatably fixed element, said ring being translationally fixed along its axis relative to the frame.

A method according to the invention may thus comprise a step of rotatably driving said ring relative to said first rotatably fixed element, said ring being translationally fixed along its axis relative to the frame.

According to one possible characteristic, said rotational driving means comprise a motor connected to said ring by a cascade of pinions.

According to one possible characteristic, a device according to the invention comprises means for measuring at least one piece of information representative of the thrust along the axis of said spindle generated by said second element on said surface.

A method according to the invention may thus comprise a step of measuring at least one piece of information representative of the thrust along the axis of said spindle generated by said second element on said surface.

According to one possible characteristic, a device according to the invention comprises means for detecting said thrust reaching:

a contacting value corresponding to the thrust value at the moment when the free end of the second element contacts said surface and,
a pressing value of said structure to be worked on.

A method according to the invention may thus comprise a step of detecting said thrust reaching:

a contacting value corresponding to the thrust value at the moment when the free end of the second element contacts said surface and,
a pressing value of said structure to be worked on.

According to one possible feature, a device according to the invention comprises means for measuring at least one piece of information representative of the inclination of said second element relative to the axis of said spindle.

A method according to the invention may thus comprise a step of measuring at least one piece of information representative of the inclination of said second element relative to the axis of said spindle.

According to one possible characteristic, said means for measuring at least one piece of information representative of the inclination comprise distance sensors, for example inductive or laser or the like, carried by said frame and evenly distributed around said second element, said sensors being able to measure the radial movement of said second element relative to the frame.

A method according to the invention may thus comprise a step of measuring the radial movement in the plane of the sensors of said second element relative to the frame.

According to one possible characteristic, said first and second elements are tubular.

According to one possible characteristic, a reference frame is associated with said frame, said device comprising means for measuring a translational movement of said first element relative to the reference frame of said frame along the axis of said spindle.

A method according to the invention may thus comprise a step of measuring a translational movement of said first element relative to the reference frame of said frame along the axis of said spindle.

According to one possible characteristic, said means for measuring the translational movement of said first element with respect to said reference frame of said frame comprise a sensor for measuring the rotation angle of the rotor of said motor.

A method according to the invention may thus comprise a step of measuring the rotation angle of the rotor of said motor.

According to one possible characteristic, a device according to the invention comprises means for determining the distance, along a direction parallel to the axis of said spindle, between the surface oriented towards said device of said structure to be worked on and a reference surface of said frame in said reference frame associated with said frame, said determining means determining said distance when said device is secured to said structure to be worked on by said securing means, by taking account of the value of the angle provided by said angle sensor at the moment when said detection means detect said thrust reaching said contacting value corresponding to the thrust value at the moment when the free end of the second element contacts said surface.

A method according to the invention may thus comprise a step of determining the distance, along a direction parallel to the axis of said spindle, between the surface oriented towards said device of said structure to be worked on and a reference surface of said frame in said reference frame associated with said frame, said determining step consisting in determining said distance when said device is secured to said structure to be worked on by said securing means, by taking account of the value of the angle at the moment when said thrust reaches said contacting value corresponding to the thrust value at the moment when the free end of the second element contacts said surface.

According to one possible alternative, a device according to the invention comprises means for measuring the deformation of said structure to be worked on under said pressing force, said deformation corresponding to the translational movement of the first element between the moments when said detection means detect that the value of said thrust passes from said contacting value to said pressing value.

A method according to the invention may thus comprise a step of measuring the deformation of said structure to be worked on under said pressing force, said deformation corresponding to the translational movement of the first element between the moments when the value of said thrust changes from said contacting value to said pressing value.

According to one possible alternative, a device according to the invention comprises:
- at least two functional modules, each of said functional modules comprising at least one movable member capable of enabling performance of a given task;
- a single drive spindle rotatably and/or translationally movable along a same axis and capable of cooperating individually with said movable members to give them a rotational and/or translational motion enabling performance of their given task.

According to one possible characteristic, said functional modules belong to the group comprising at least:
- the drilling modules;
- the modules for setting sealant-coated rivets;
- the modules for setting temporary fasteners.

The invention also covers a method for performing at least one task on a structure to be worked on by means of a device according to any of claims 1 to 16 comprising a presser element comprising a first and a second element connected by a ball-and-socket joint, said method comprising a step of translationally moving said first element along the axis of said spindle in such a way that the second element is oriented orthogonally to said surface when compressed against said surface.

5. DESCRIPTION OF THE FIGURES

Further characteristics and advantages of the invention will become apparent upon reading the following description of particular embodiments, given by way of mere illustrative and non-limiting example, and the appended drawings, among which.

6. DESCRIPTION OF PARTICULAR EMBODIMENTS

6.1. Architecture

Means for Fastening to Handling Means

An example of a multitask device according to the invention is described in relation to FIGS. 1 to 4.

As represented in these figures, such a multitask device 1 comprises a frame 2.

This frame 2 is equipped with means for fastening 3 to a motor-driven handling device (not represented) to which it is intended to be secured so that it can be moved at least partly relative to a structure to be worked on (not represented).

These motor-driven handling means belong to the group comprising especially:
- robot arms;
- walking robots, for example according to the principle described in patent document FR-B1-2 809 034;
- digital grids for example according to the principle described in patent document WOA-2-200349899.

Such fastening means 3 are known per se and are therefore not described. For example, they may comprise a plate and bolt type system, collar type quick securing means, a clamp or cam system, etc.

The motor-driven handling means are capable of moving the multitask device at least partly (especially when the controller is fixed) in space relative to the surface of the structure to be worked on between at least one approach position in which the device is close to the surface while being distant from it and a docking position in which the device is applied against the surface, for example with a view to being secured to it if securing means are implemented. They may also place the multitask device in a storage position when not in use to perform an operation.

Single Output Spindle

The device comprises a single drive spindle 7 rotatably and/or translationally movable along a single axis.

The device also comprises motor and transmission means MT to make it possible to give the spindle a rotational and/or translational motion along its longitudinal axis. These motor and transmission means are known per se and are not described in more detail here.

Controller

The device conventionally comprises a controller 4 comprising control and power electronics for controlling and powering the device.

This controller 4 is preferably contained in a cabinet distant from the frame 2 and stored in a fixed location on site.

The controller 4, or at least some of its components, could nevertheless be carried on board the frame 2.

Means for Securing to a Structure to be Worked on (Optional)

The device may optionally, but preferably, comprise means for securing 5 to the structure to be worked on.

These securing means may be of different types.

For example, they may comprise suction cups 51 secured to the frame 2 and capable of being connected to vacuum means, such as a vacuum pump, for example, to improve securement to the surface of the structure to be worked on. These suction cups can be assembled in groups to form suction pads.

When no means for securing to the structure to be worked on is implemented, the handling device can constitute not only a means for positioning the frame relative to the structure to be worked on but also a means for fixing it in position relative to the structure to be worked on.

Functional Modules

The device is likely to carry a plurality of functional modules MF on board.

Each of these functional modules MF enables a particular task to be performed, such as, for example, a drilling and/or milling operation, an operation for setting rivets, an operation for setting a temporary fastener (for example, a staple), or an operation for applying (or coating) a bead of sealant to a fastening element (a rivet or a screw). Other functions could be contemplated, such as screwing.

The functional modules belong for example to the group comprising at least:
drilling and/or milling modules;
modules for setting rivets, whether or not coated with sealant;
modules for setting temporary fasteners.

A temporary fastener used in the aeronautical industry is a mechanical member that enables at least two walls to be clamped together for the purpose of performing production operations necessary for the final assembly of these walls, such as counter-drilling or setting screws or rivets.

By definition, these temporary fasteners are removed as the screws or rivets perform their function of assembling the walls.

The temporary fasteners are placed in holes in the walls after the initial relative positioning of the walls.

The temporary fasteners only require access to one side of one of the walls.

Such functional modules are especially described in patent documents PCT/EP2020/069158, PCT/EP2020/069159, PCT/EP2020/069160, PCT/EP2020/069161, PCT/EP2020/069162, filed by the applicant.

The device comprises means 12 for bringing the various on-board modules into alignment with the spindle 7 to perform a task. Such means may for example comprise a carousel, cartridge belt or the like.

Presser Element

The device comprises a tubular shaped presser element 6 translationally movably mounted relative to the frame 2 along the axis of movement of the spindle 7 and in the extension of the latter. The presser element is therefore coaxial with the spindle. Insofar as it is tubular, the spindle can translate inside the presser element.

Such a presser element 6 may for example be used during a drilling operation to exert a compressive force on the structure to be drilled, especially to ensure contact between the plates of a stack and to avoid the introduction of chips and/or the formation of burrs between these plates during drilling.

The presser element 6 comprises a first element 61 and a second element 62 connected by a ball-and-socket joint 630 along the axis of the spindle.

The second element 62 comprises a free end 620 capable of contacting the surface of the structure to be worked on.

The first element 61 is translationally movable along the axis of the spindle such that the second element 62 is oriented orthogonally to the surface when compressed against the surface.

The presser element comprises an intermediate element 63. The intermediate element 63 comprises an end 631 oriented towards the frame 2 to which it is fixedly secured. It comprises an opposite end 632 oriented towards the free end 620 of the second tubular element 62. The first element 61 is translationally slidably mounted inside the intermediate element along the axis of the spindle while being rotatably stationary along this axis. The intermediate element 63 is therefore a means for translationally guiding the first element 61.

The presser element comprises a ring 64. This ring is tapped. It is mounted so as to be rotatably movable but translationally stationary along the axis of the spindle, by being connected to the intermediate element by means of a pair of ball bearings 65.

The first tubular element 61 comprises a threaded portion provided at its periphery which cooperates with the tapped part of the ring. These tapped and threaded portions form a screw-nut system.

The device comprises means for rotatably driving the ring. These rotational driving means comprise a motor 8 whose rotor comprises a shaft 81 connected to the ring 64 by means of a cascade of spur pinions 82, the ring carrying a pinion on its periphery. Other motor and transmission types could be implemented to rotatably drive the ring, for example a belt transmission.

The screw-nut system, the cascade of pinions and the motor constitute means for translationally driving the first tubular element 61.

The motor 8 is equipped with an angle sensor 83 capable of measuring the rotation angle of the rotor relative to the stator.

Measurement of the Thrust Applied by the Presser Element

In one embodiment, the device comprises means for measuring at least one piece of information representative of the thrust along the axis of the spindle generated by the second element 62 of the presser element 6 on the surface of the structure to be worked on.

In this embodiment, these measuring means comprise a thrust sensor 9 which comprises strain gauges disposed on the first element 61. Alternatively, other types of thrust sensors could be implemented.

The device further comprises means 10 for detecting the thrust reaching:
a contacting value corresponding to the thrust value at the moment of the free end of the second element contacting the surface of the structure to be worked on and,
a pressing value of the structure to be worked on.

The contacting thrust value is the thrust value recorded as it changes from zero to a non-zero value.

The pressing thrust value is a predetermined value to which it is desired to apply thrust.

Possible uses of this data will be described in more detail later.

Determination of the Deformation of the Structure to be Worked on Under the Effect of the Thrust Imparted by the Presser Element In one embodiment, the device comprises means for measuring 11 the deformation of the structure to be worked on under said pressing force.

The deformation measured by these measuring means corresponds to the translational movement of the first element 61 between the moments when the detection means detect that the value of the thrust passes from the contacting value to the pressing value.

Measurement of the Inclination of the Presser Element

In one embodiment, the device comprises means 12 for measuring at least one piece of information representative of the inclination of the second element 62 relative to the axis of the spindle.

In this embodiment, the means for measuring at least one piece of information representative of the inclination comprise inductive sensors 120. In an alternative, they could be laser sensors or the like.

Figure 1:
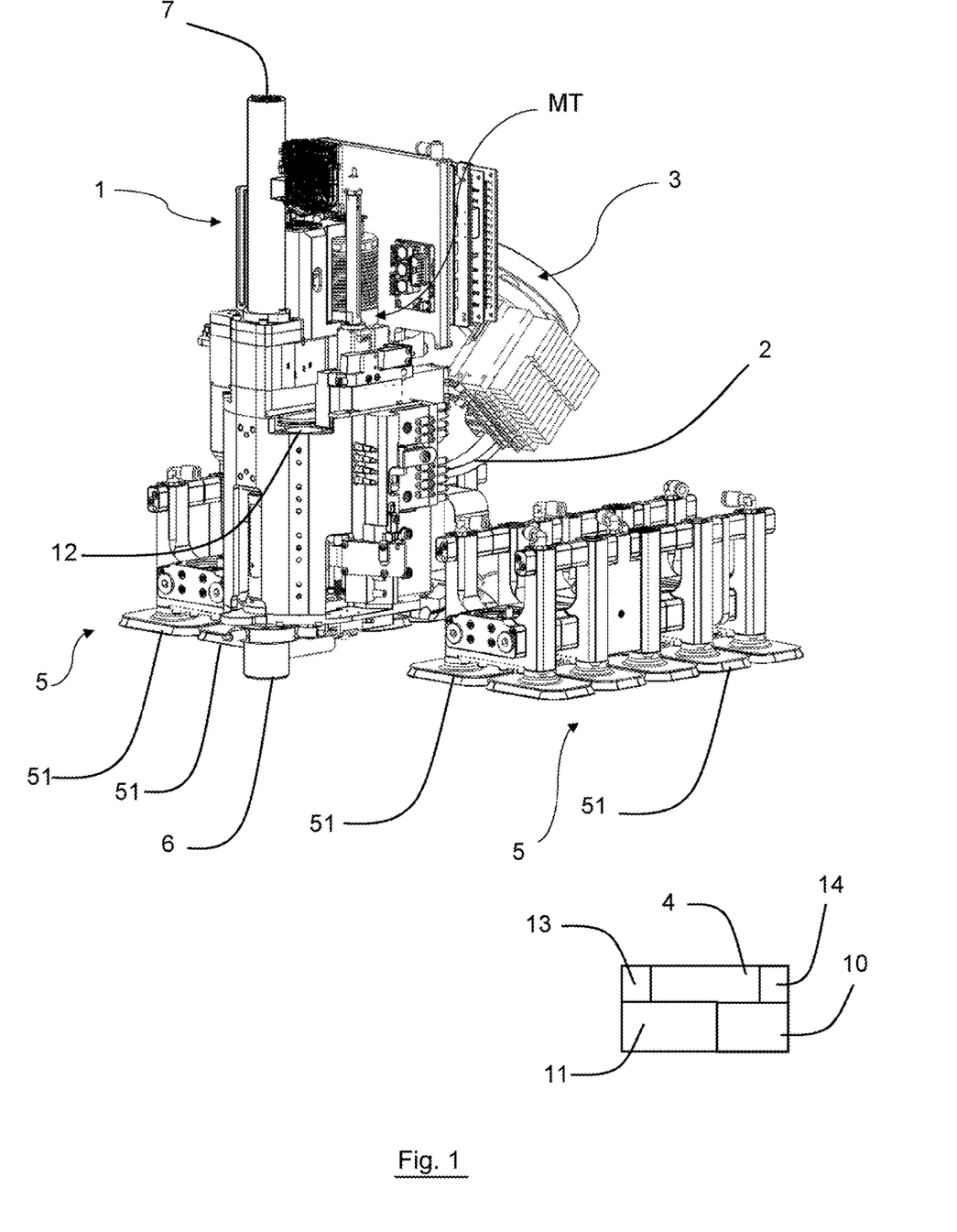
FIG. 1 illustrates a perspective view of an example of a multitask device according to the invention.
Figure 2:
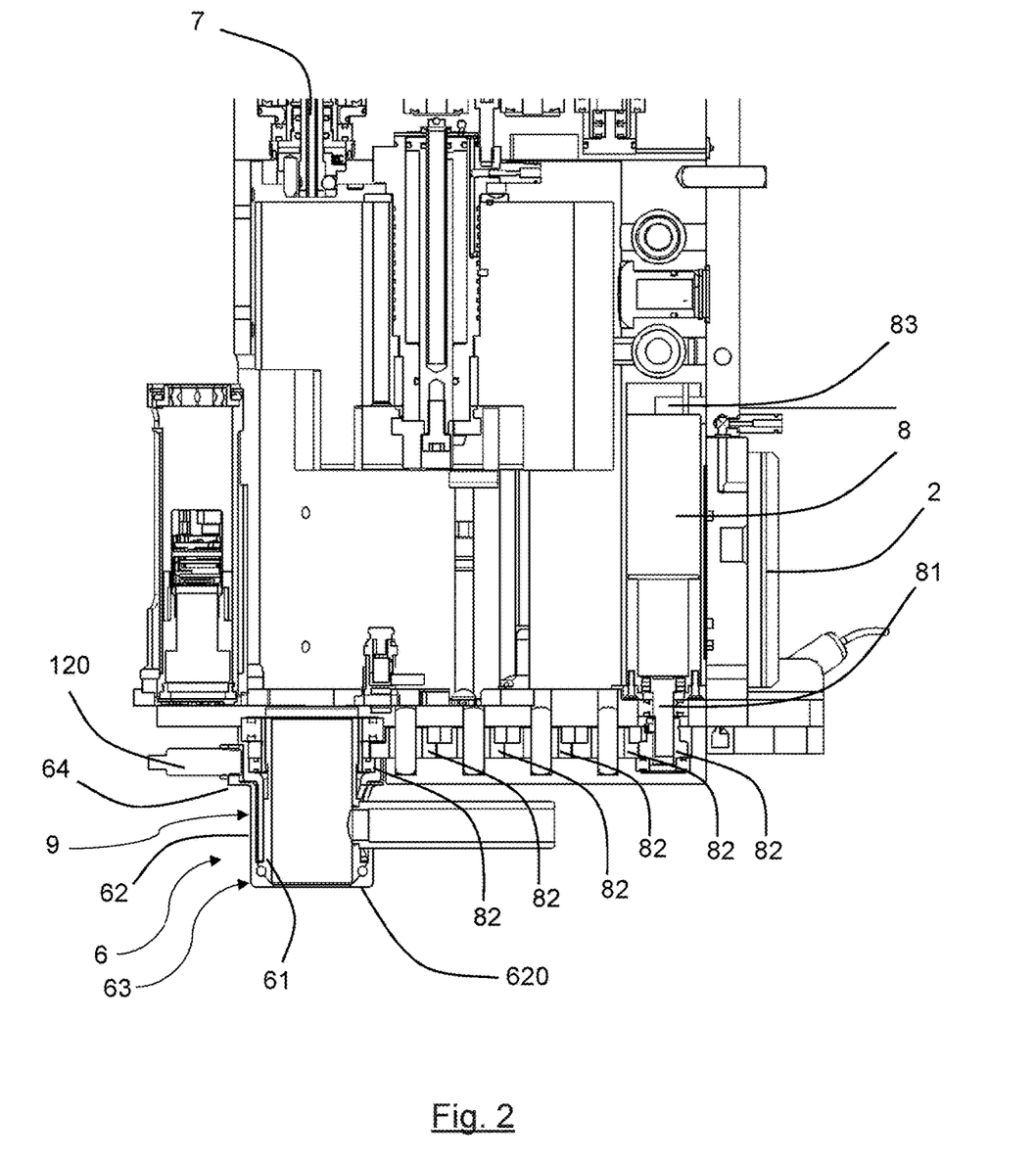
FIG. 2 illustrates a partial cross-sectional view along a plane passing through the axis of the spindle of the device of FIG. 1.
Figure 3:
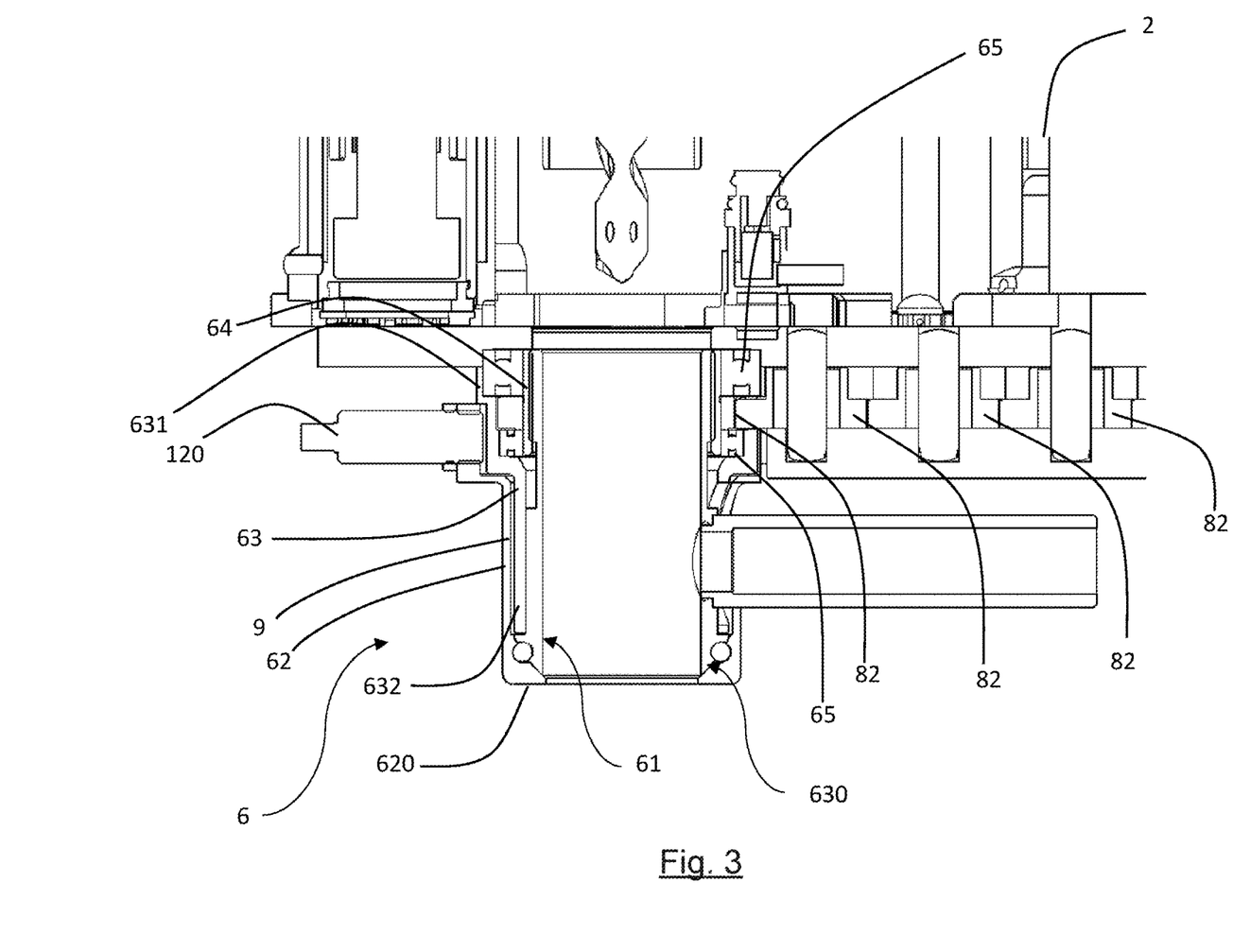
FIG. 3 shows a detail view of FIG. 1 centred on the presser element.
Figure 4:
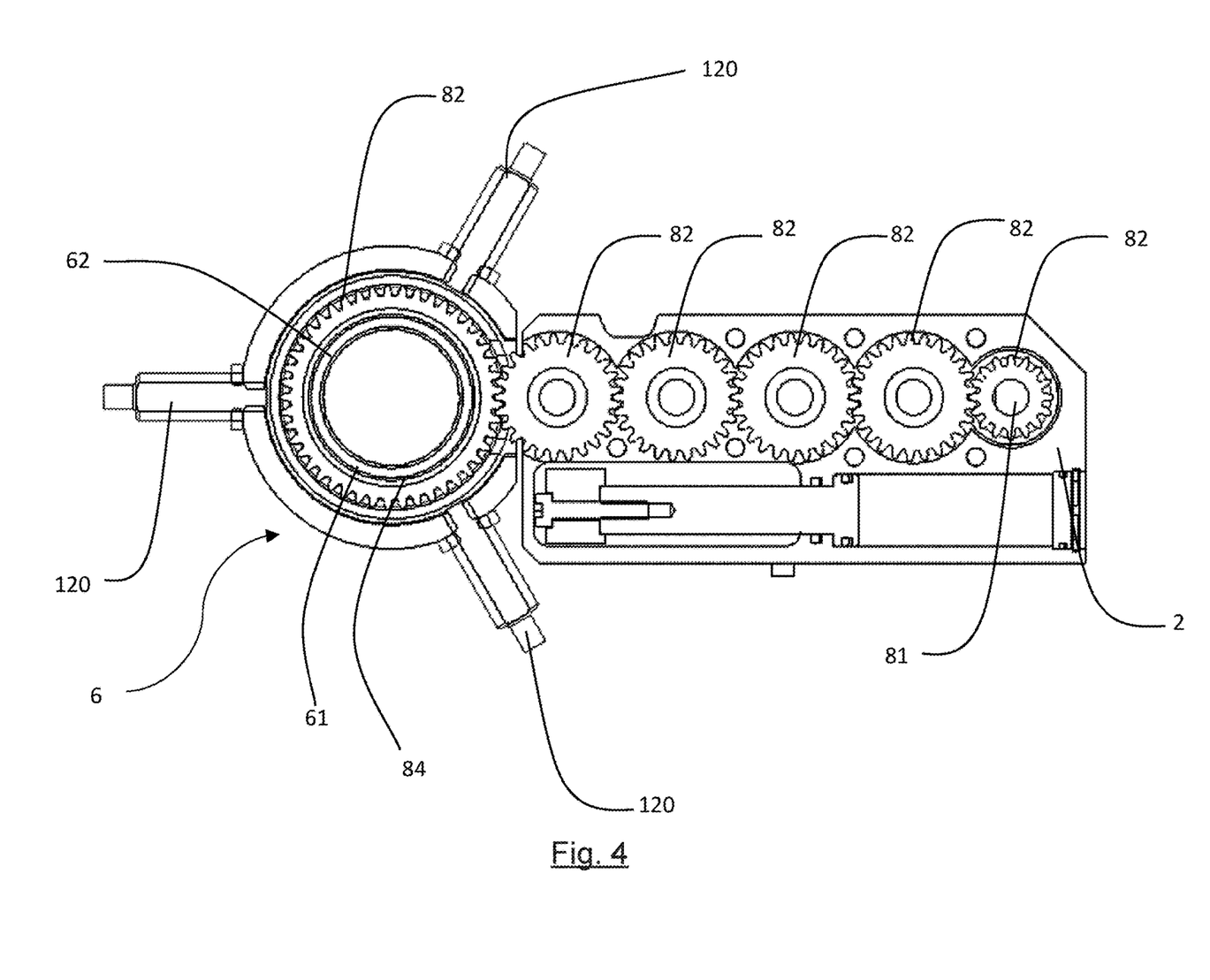
FIG. 4 shows a cross-sectional view of FIG. 3 in a plane orthogonal to the axis of the spindle.
Figure 5:
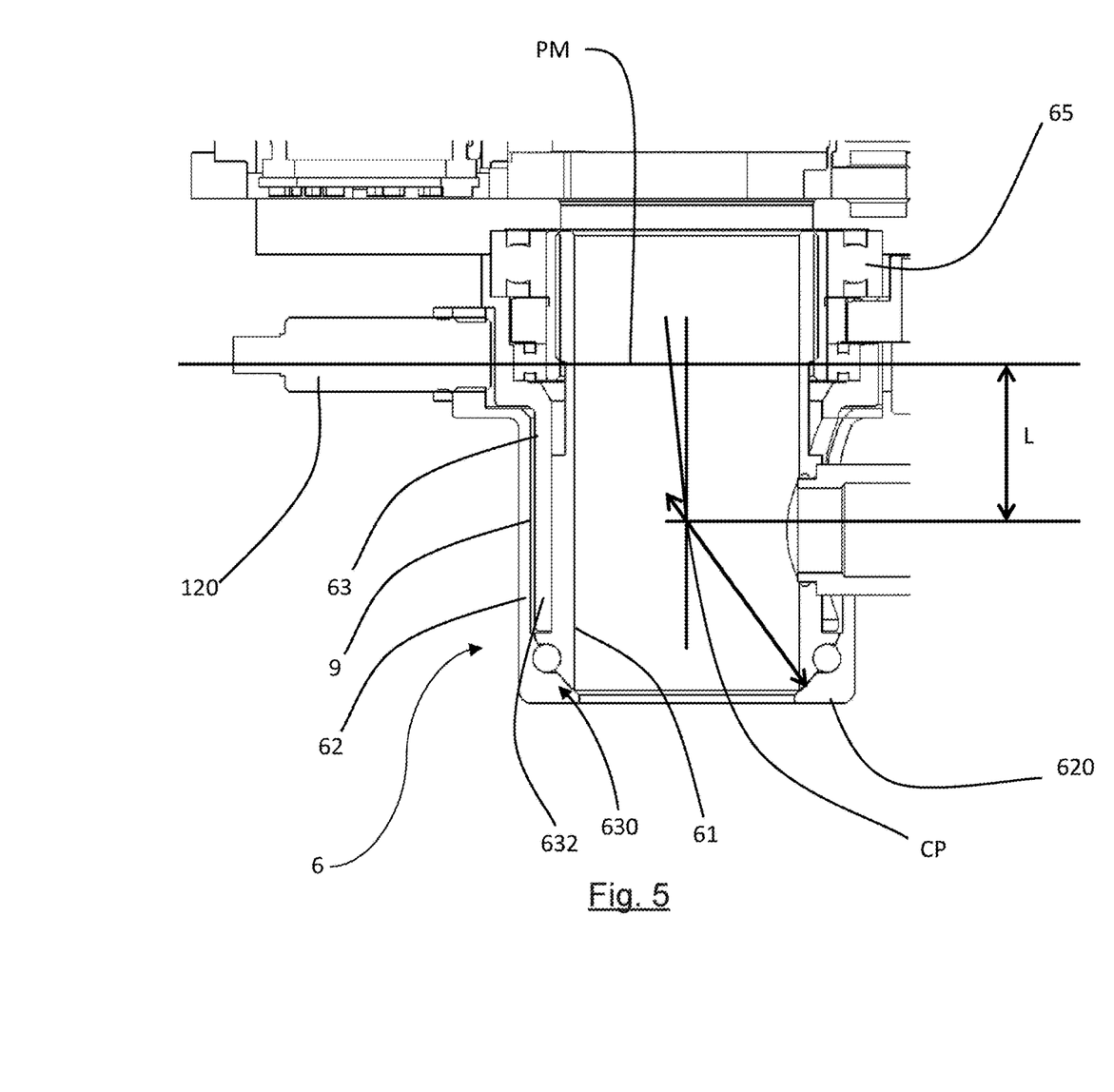
FIG. 5 shows a detail view of FIG. 3.

These inductive sensors are carried by the frame and evenly distributed around the second element 62 and are capable of measuring a radial movement of the second element 62 relative to the first element 61. These sensors are preferably three in number. This radial movement is measured in the median plane PM of the sensors, itself distant by a value L from the pivot centre CP of the first presser element 61. The radial movement is not necessarily in the plane of one of the sensors, and is therefore calculated from the signals supplied by two of the sensors, possibly correlated with the signal from the third sensor. The use of said signals leads to the knowledge of the eccentricity of the section of the presser element located in the median plane of the sensors as well as the orientation of the movement of said section in the median plane.

It is thus possible to know the value of the inclination as well as the orientation of the plane in which the inclination occurs. The calculation of the inclination is based on geometric rules known in the state of the art and will not be detailed here.

The implementation of these means for measuring the inclination of the presser element makes it possible to determine whether the presser element is coaxial or inclined relative to the spindle.

A maximum value of inclination is defined beforehand, if the actual inclination is lower than this value, then the inclination is simply recorded and the drilling is continued. If the actual inclination is greater than the predetermined value then the positioning of the end effector relative to the surface to be worked on is corrected.

If the actual inclination is zero then the spindle is orthogonal to the surface of the structure to be worked on.

Measuring the Output Distance of the Presser Element

In one embodiment, a reference frame is associated with the frame, one of the three axes of which is parallel to the axis of the spindle, and the origin can be located at the intersection between the axis of the spindle and a reference surface of the frame of the end effector perpendicular to the axis of the spindle.

In this case, the device comprises means 13 for measuring a translational movement of the first element 61 of the presser element 6 relative to the reference frame of the frame along the axis of the spindle.

In this embodiment, these means for measuring the translational movement of the first element relative to the reference frame of the frame comprise the sensor for measuring the rotation angle of the rotor of the motor implemented to rotatably drive the ring 64 and thus translationally drive the presser element 6.

Thus, the angle values supplied by the angle sensor of the motor can be used to calculate the distance between the free end of the second element 62 of the presser element and the origin of the reference frame according to the following formula:

$$\text{Distance surface/origin} = \text{Measured angle} \times \text{Const1} + \text{Const2}$$

Constants 1 and 2 are determined from the geometrical characteristics of the end effector including the pitch of the screw-nut system described above, the transmission ratio between the motor and the ring, the angular position of the angle sensor of the motor corresponding to the angle zero etc.

Determining the Distance Between the Surface of the Structure to be Worked on and the Device In one embodiment, the device comprises means 14 for determining the distance, in a direction parallel to the axis of the spindle, between the surface oriented towards the device of the structure to be worked on and the reference surface of the frame in the reference frame associated with said frame.

In this case, the previously mentioned reference frame for measuring the output distance of the presser element can be used to determine the distance between the surface of the structure to be worked on and the device.

These determining means are capable of determining this distance when the device is secured to the structure to be worked on by the securing means. For this, they take account of the value of the angle provided by the angle sensor 83 at the moment when the detection means detect that the thrust has reached the contacting value corresponding to the thrust value at the moment when the free end of the second element contacts the surface of the structure to be worked on, in order to determine this distance according to the following formula:

$$\text{Distance surface/frame} = \text{Measured angle} \times \text{Const3} + \text{Const4}$$

Constants 3 and 4 are determined from the geometrical characteristics of the end effector including the pitch of the screw-nut system described above, the transmission ratio between the motor and the ring, the angular position of the motor angle sensor corresponding to the zero of the angle etc.

6.2. Operation

To perform a task on a structure to be worked on, the handling means are initially implemented to move the multitask device to the location on the structure where the task has to be performed.

This initial approach is based on the fact that the control means of the handling means know the geometry of the structure to be worked on and are therefore capable of positioning the end effector on the location where the hole has to be made.

At the end of this initial approach the multitask device is in a position such that the axis of the spindle is substantially coaxial with the axis of the hole to be made, said device remaining at a certain distance from the surface of the structure to be treated.

However, due to the various inaccuracies of the handling means and the structure, the position of the end effector relative to the structure has to be refined by using registering elements previously provided or disposed on the structure to be worked on in order to identify the location(s) where tasks have to be performed.

Means for controlling the orthogonality of the axis of the spindle relative to the surface, such as for example a camera mounted coaxially with the spindle and coupled to lasers projecting a pattern onto the surface of the structure, are implemented to check whether or not the axis of the spindle is orthogonal to the surface. If it is not, the orientation of the device is changed by the handling means so as to correct the inclination of the axis of the spindle relative to the surface.

A misalignment of the axis of the spindle with respect to the registering element can also be determined by the use of the camera and is corrected accordingly by moving the multitask device in parallel to the surface.

If the initial registering element is a pre-existing hole, the handling means first centre the spindle of the end effector on this hole and then move the multitask device relative to this hole to the location of the hole to be made, the relative positioning of these holes being known to the control means of the handling means.

Once the position of the device and the orthogonality of the spindle are correct, the device is moved from its approach position to its docking position by the handling means in a direction normal to the surface.

The securing means, for example the suction cups, are activated if necessary to secure the frame to the structure to be worked on.

After securing, the presser element is moved towards the surface of the structure to be worked on in order to press it against the surface of the structure to be worked on. For this, the motor 8 is actuated to rotatably drive the ring 64. Under the effect of the rotation of the ring 64, the first element 61 of the presser element translates along the axis of the spindle towards the surface of the structure to be worked on. The free end 620 of the second element 62 progressively contacts the surface inducing, by a ball-joint effect, an application of the end 620 of the second element 62 against the surface of the structure to be worked on.

Throughout the deployment of the presser element 6, the means for measuring the translational movement of the presser element measure the rotation angle of the motor.

The thrust measuring means measure the thrust until they detect the instant at which the value of the thrust exerted on the surface by the presser element reaches the contacting value.

The means for determining the distance, in a direction parallel to the axis of the spindle, between the surface oriented towards the device of the structure to be worked on and the reference surface of the frame then determine this distance by taking account of the value of the angle provided by the angle sensor at the moment when said detection means detect that the thrust has reached the contacting value corresponding to the thrust value at the moment when the free end of the second element contacts the surface.

Knowing the distance of deployment of the presser element and/or the distance between the surface of the structure to be worked on and the reference surface of the frame can make it possible to check that the device is correctly positioned relative to the surface. If the deployment is too small or too large relative to the theoretical relative position of the device to the surface, this may mean that the device is actually incorrectly positioned and the position of the device has to be corrected after the securing means have been deactivated. In this case, the controller controls the device to make the required position correction.

The presser element continues to be deployed until the thrust measuring means detect that the thrust has reached the predetermined pressing value corresponding to the desired pressure to be applied against the surface of the structure to be worked on.

The inclination measuring means determine the inclination of the presser element relative to the axis of the spindle.

In an alternative, the inclination of the axis of the presser element with respect to that of the spindle is measured and then:
  if the inclination is less than a first predetermined value, drilling is performed and the value of the fault (that is, the inclination) is recorded;
  if the inclination is greater than a second predetermined value, the process of positioning the device is repeated.

The means for measuring the deformation of the structure to be worked on determine, when the thrust reaches the pressing value, the deformation undergone by the structure to be worked on under the effect of the pressure imposed by the presser element. This deformation corresponds to the translational movement of the first element 61 between the moments when the detection means detect that the value of the thrust passes from the contacting value to the pressing value. This deformation can be compared to a reference value to ensure that the deformation imparted to the structure to be worked on is suitable.

The module corresponding to the desired operation to be performed is placed in the axis of the spindle and matched to it.

The spindle is then moved to perform the desired operation, for example drilling and/or milling, setting a coated or uncoated rivet, setting a temporary fastener, etc.

Once the operation has been completed, the spindle is disengaged from the functional module and the functional module is moved in order to no longer be in the axis of the spindle.

Other tasks can then be performed at the same location (for example, placing a rivet in a hole) or at another location on the structure to be worked on.

An exemplary embodiment of the present invention provides an effective solution to at least some of these various problems.

In particular, at least one embodiment provides a technique for improving multitask devices provided with a presser element.

Especially, at least one embodiment provides a multitask device provided with a presser element that is versatile in terms of the functionalities likely to be offered.

An exemplary embodiment enables orthogonality of the spindle with respect to the surface of the structure to be worked on to be checked.

An exemplary embodiment provides such a technique which enables the pressure exerted by a presser element on a surface against which it is compressed to be controlled.

An exemplary embodiment enables initial distance between a multitask device and the surface of a structure to be worked on to be evaluated at the moment when the presser element contacts this surface.

An exemplary embodiment enables depth of movement of the surface to be evaluated when the force of the presser element is applied to the surface.

An exemplary embodiment provides such a technique which is reliable, robust and compact.

Although the present disclosure has been described with reference to one or more examples, workers skilled in the art will recognize that changes may be made in form and detail without departing from the scope of the disclosure and/or the appended claims.

The invention claimed is:

1. A device for performing at least one task on a structure to be worked on, said device comprising:
   a frame;
   a fastener for fastening said frame to a motor-driven handler capable of moving said device at least partly in space relative to a structure to be worked on;
   a positioning/securing element for positioning and/or securing said frame to said structure to be worked on;
   a spindle rotatably or translationally drivable along a same axis in order to perform said at least one task;
   a presser element, coaxial with said spindle, capable of exerting a compressive force against the surface of said structure to be worked on when said device is secured to said structure by said fastener;
   said presser element comprising a first and a second element connected by a ball-and-socket joint, said second element comprising a free end capable of contacting said surface and said first element being translationally movable along the axis of said spindle in such a way that the second element is oriented orthogonally to said surface when compressed against said surface.

2. The device according to claim 1 comprising a translational driver for translationally driving said first element.

3. The device according to claim 2 wherein said translational driver comprise a screw-nut system.

4. The device according to claim 3 wherein said screw-nut system comprises a threaded portion provided at the periphery of said first element and a rotatably movable tapped ring of complementary shape, said translational driver comprising a rotational driver for rotatably driving said ring relative to said rotatably fixed first element, said ring being translationally fixed along its axis relative to the frame.

5. The device according to claim 4 wherein said rotational driver comprises a motor connected to said ring by a cascade of pinions.

6. The device according to claim 1 comprising a thrust sensor for measuring at least one piece of information representative of thrust along the axis of said spindle generated by said second element on said surface.

7. The device according to claim 6 comprising means for detecting said thrust reaching:
a contacting value corresponding to a thrust value at the moment of the free end of the second element contacting said surface and,
a pressing value of said structure to be worked on.

8. The device according to claim 1 comprising an inclination sensor for measuring at least one piece of information representative of inclination of said second element relative to the axis of said spindle.

9. The device according to claim 8 wherein said inclination sensor comprises distance sensors carried by said frame and evenly distributed around said second element, said distance sensors being capable of measuring radial movement of said second element relative to the frame.

10. The device according to claim 1 wherein said first and second elements are tubular.

11. The device according to claim 1 wherein a reference frame is associated with said frame, said device comprising a translational movement sensor for measuring a translational movement of said first element relative to the reference frame of said frame along the axis of said spindle.

12. The device according to claim 11 comprising a thrust sensor for measuring at least one piece of information representative of thrust along the axis of said spindle generated by said second element on said surface, wherein said translational movement sensor comprises an angle sensor for measuring rotation angle of a rotor of said motor.

13. The device according to claim 12, comprising:
a thrust sensor for measuring at least one piece of information representative of thrust along the axis of said spindle generated by said second element on said surface;
detection means for detecting said thrust reaching:
a contacting value corresponding to a thrust value at the moment of the free end of the second element contacting said surface; and
a pressing value of said structure to be worked on; and
means for determining the distance, along a direction parallel to the axis of said spindle, between the surface oriented towards said device of said structure to be worked on and a reference surface of said frame in said reference frame associated with said frame, said determining means determining said distance when said device is secured to said structure to be worked on by said securing means, by taking account of the value of the angle provided by said angle sensor at the moment when said detection means detect that said thrust has reached said contacting value corresponding to the thrust value at the moment when the free end of the second element contacts said surface.

14. The device according to claim 7 comprising means for measuring deformation of said structure to be worked on under said compressive force, said deformation corresponding to translational movement of the first element between moments when said detection means detect that the value of said thrust passes from said contacting value to said pressing value.

15. The device according to claim 1 wherein said device is of the multitask type and comprises:
at least two functional modules, each of said functional modules comprising at least one movable member capable of enabling performance of a given task;
a single drive spindle rotatably and/or translationally movable along a same axis and capable of cooperating individually with said movable members to give the movable members a rotational and/or translational motion enabling the movable members to perform their given task.

16. The device according to claim 15 wherein said functional modules belong to the group consisting of:
drilling modules;
modules for setting sealant-coated rivets; and
modules for setting temporary fasteners.

17. A method comprising:
performing at least one task on a structure to be worked on by using a device comprising:
a frame;
a fastener for fastening said frame to a motor-driven handler capable of moving said device at least partly in space relative to a structure to be worked on;
a positioning/securing element for positioning and/or securing said frame to said structure to be worked on;
a spindle rotatably or translationally drivable along a same axis in order to perform said at least one task;
a presser element, coaxial with said spindle, capable of exerting a compressive force against the surface of said structure to be worked on when said device is secured to said structure by said fastener;
said presser element comprising a first and a second element connected by a ball-and-socket joint, said second element comprising a free end capable of contacting said surface and said first element being translationally movable along the axis of said spindle in such a way that the second element is oriented orthogonally to said surface when compressed against said surface; and
wherein performing the task comprises translationally moving said first element along the axis of said spindle in such a way that the second element is oriented orthogonally to said surface when compressed against said surface.

* * * * *